US009106708B2

(12) United States Patent
Bouchat et al.

(10) Patent No.: US 9,106,708 B2
(45) Date of Patent: Aug. 11, 2015

(54) DYNAMIC CHANGE OF MAC ADDRESS

(75) Inventors: Christele Bouchat, Antwerp (BE); Sven Jozef Jeanne Van den Bosch, Lochristi (BE); Michel Ferdinand Pauline Tassent, Hamme (BE); Erwin Alfons Constant Six, Kalken (BE); Jeanne Emmanuelle Rita De Jaegher, Brussels (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1753 days.

(21) Appl. No.: 10/882,235

(22) Filed: Jul. 2, 2004

(65) Prior Publication Data

US 2005/0044273 A1 Feb. 24, 2005

(30) Foreign Application Priority Data

Jul. 3, 2003 (EP) ..................................... 03291655

(51) Int. Cl.
*G06F 15/16* (2006.01)
*H04L 29/12* (2006.01)

(52) U.S. Cl.
CPC ...... *H04L 61/2038* (2013.01); *H04L 29/12254* (2013.01); *H04L 29/12264* (2013.01); *H04L 29/12349* (2013.01); *H04L 29/12839* (2013.01); *H04L 61/2046* (2013.01); *H04L 61/2507* (2013.01); *H04L 61/6022* (2013.01)

(58) Field of Classification Search
USPC .......... 709/226, 245; 370/252, 328, 352, 401, 370/466
See application file for complete search history.

(56) References Cited

U.S. PATENT DOCUMENTS 5,444,692 A * 8/1995 Basso et al. ................... 370/222
6,711,162 B1 * 3/2004 Ortega et al. ................. 370/389
(Continued)

OTHER PUBLICATIONS

E. M. Loucks et al, "Implementation of a Dynamic Address Assignment Protocol in a Local Area Network", Computer Networks and ISDN Systems, North Holland Publishing, Amsterdam, NL, vol. 11, No. 2 Feb. 1986, pp. 133-146, XP000211676.
(Continued)

*Primary Examiner* — Tammy Nguyen
(74) *Attorney, Agent, or Firm* — Chiesa Shahinian & Giantomasi

(57) ABSTRACT

The present invention is related to a method to control and to change dynamically a MAC address in an aggregation network containing at least a server computer device and a client device, comprising the steps of:
 Sending from said client device to a server computer device a message (1,11) containing the MAC address of said client computer device,
 Retrieving said MAC address from said message at said server computer device (2,12),
 Checking if said MAC address is already in use (by a user) in said network or if said server computer device wants to change all MAC addresses in said network,
 If so, sending from said server computer device to said client device a message (3,13) containing a new MAC address for said client,
 Overwriting said MAC address with said new MAC address in said client computer device (4,14).

8 Claims, 2 Drawing Sheets

(56) References Cited

U.S. PATENT DOCUMENTS

| | | |
|---|---|---|
| 6,791,956 B1* | 9/2004 | Leu .................................. 370/328 |
| 6,856,616 B1* | 2/2005 | Schuster et al. ............... 370/352 |
| 6,928,478 B1* | 8/2005 | Gangadharan ................ 709/226 |
| 7,234,163 B1* | 6/2007 | Rayes et al. .................... 726/22 |
| 2001/0036192 A1* | 11/2001 | Chiles et al. ................... 370/401 |
| 2003/0185233 A1* | 10/2003 | Ji et al. ........................... 370/466 |
| 2004/0001392 A1* | 1/2004 | Chung ............................ 368/278 |
| 2004/0001492 A1* | 1/2004 | Johnson ..................... 370/395.32 |
| 2004/0052216 A1* | 3/2004 | Roh ................................ 370/252 |
| 2007/0214282 A1* | 9/2007 | Sen ................................. 709/245 |

OTHER PUBLICATIONS

I. S. Gopal et al, "Dynamic Address Assignment in Broadcast Networks", IEEE Transactions on Communications, IEEE, Inc. New York, US, VOI. COM-34, No. 1, Jan. 1986, pp. 31-37, XP000811899.

R. Droms et al, "Automated Configuration of TCP/IP with DHCP", IEEE Internet Computing, IEEE Service Center, Piscataway, NJ, US, vol. 3, No. 4, 1999, pp. 45-53, XP000874503.

* cited by examiner

DYNAMIC CHANGE OF MAC ADDRESS

The present invention is related to an aggregation network used in the access and/or in the Metro network, wherein the user's MAC address is in control of the network access provider.

PPP (Point-to-Point Protocol) is used to set up connectivity for end user sessions in networks with DSL access and ATM or Ethernet aggregation. The ATM or Ethernet aggregation network is further referred to as the aggregation network, but note it can also be an MPLS or whatever technology. During PPP set-up the source MAC address is used as a session identifier. The source MAC address cannot be guaranteed to be unique (e.g. because it is possible to be over-written by the end users via some software and some hardware vendors are known to use the same MAC address for thousands of Network Interface Cards). In the current situation, when a duplicate MAC address would occur, the Broadband Access Server BAS needs to use additional information such as for example the VP/VC (Virtual Path/Virtual Channel) or the session_id in order to uniquely determine the session.

The source MAC address of terminals over the access network cannot be guaranteed to be unique in the aggregation network, therefore the problem could arise in the aggregation network that a user is unwillingly or willingly stealing another user's connection. This can be seen as a Denial of Service attack.

Today drivers exist that are able to change the MAC address of the Network Interface Card (NIC) of the DSL-user. Almost all NICs can be spoofed, even if the manufacturers don't include options in the advanced properties, meaning that one can include in, for example, the PPP or DHCP client (or any client on the user side in contact with the related server of the operator) a hook to indeed change this MAC address on request of the operator.

An example of a driver changing the user's MAC address is found in SMAC (Spoof MAC), a Windows MAC Address Modifying Utility. SMAC allows users to change a MAC address for almost any Network Interface Cards (NIC) on the Windows 2000 and XP systems, regardless of whether the manufacturers allow this option or not. SMAC takes advantage of the 'NdisReadNetworkAddress' function in the Microsoft Device Driver Development Kit (DDK). 'NdisReadNetworkAddress ( . . . )' is called by the network adapter driver to obtain a user specified MAC address in the registry. After the driver confirms there is a valid MAC address specified in the registry key, the driver programs the MAC address to its hardware registers to override the burn-in MAC address.

The present invention aims to provide a method and device wherein a user's MAC address can be changed or controlled dynamically.

The invention relates to a method to control and to change dynamically a MAC address in an aggregation network containing at least a server computer device and a client device, comprising the steps of:
  Sending from said client device to a server computer device a message containing the MAC address of said client computer device,
  Retrieving said MAC address from said message at said server computer device,
  Checking if said MAC address is already in use (by a user) in said network or if said server computer device wants to change all MAC addresses in said network,
  If so, sending from said server computer device to said client device a message containing a new MAC address for said client,
  Overwriting said MAC address with said new MAC address in said client device.

In a first preferred embodiment the message containing the MAC address of the client computer device is a DHCP discover message.

In a more specific embodiment the message containing a new MAC address for the client is an option of the DHCP protocol.

In another preferred embodiment the message containing the MAC address of the client computer device is a broadcast PPPoE Active Discovery Initiation message.

In a typical embodiment the message containing a new MAC address for the client is a PPPoE Active Discovery Offer.

As a second object the invention relates to a client device, having a MAC address and arranged for communication with a server computer device. The client device comprises means for changing said MAC address into a new MAC address upon reception of a message from said server computer device containing said new MAC address.

As a third object the invention relates to a server computer device in an aggregation network comprising at least one client device. The server computer device is arranged for receiving messages and comprises means to check if the MAC address is already in use, to decide to change said MAC address of said client device, to select a new MAC address and to send a message to said client device comprising said new MAC address.

As a last object the invention relates to a computer program product to carry out the method as previously described.

During auto-configuration (when a user requires IP connectivity), via PPP or DHCP (Dynamic Host Configuration Protocol) or other means, the Network Service Provider Broker (DHCP, RADIUS, . . . ), further referred to as server, will notice if a MAC address is already in use in the network. If that is the case, the auto-configuration process is used to request the user to change its MAC address to another address, chosen by the server, which is unique in said network. Moreover, the operator can also decide to overwrite all MAC addresses, for example, in order to install a hierarchy in the MAC addresses of its network. This is done once and for all at configuration time.

EXAMPLE WITH DHCP

Figure 1:
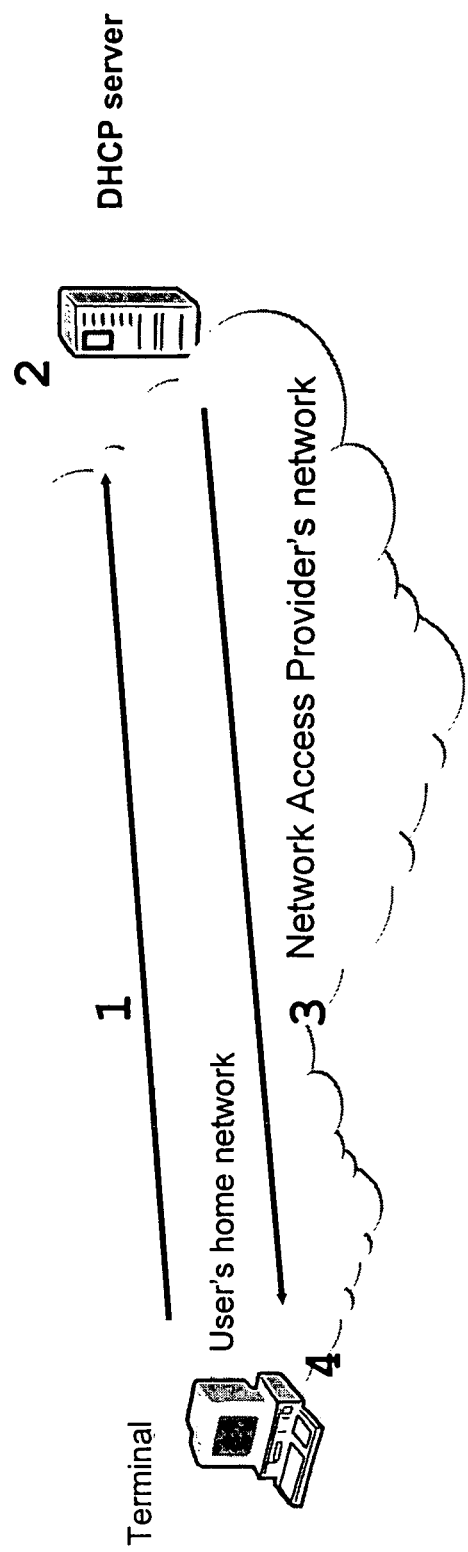
FIG. 1 illustrates a dynamic MAC address change, using DHCP as auto-configuration.

The client requests an IP address and sends a DHCP discover-message, containing its MAC address and its username@domain ('1' in FIG. 1). The server retrieves the source MAC address from the discover-message and checks if the address already is in use for another user ('2' in FIG. 1). If this is the case, or if the DHCP server decides to change all MAC addresses, the server sends back an offer with the new MAC address in one of the available options or in a new option ('3' in FIG. 1). The client receives the new MAC address and overwrites its old MAC address ('4' in FIG. 1). At this point, the procedure is continued using either a discover DHCP message or the request DHCP message, this time employing the new MAC address. The server is then informed the user has changed the MAC address. Note the DHCP messages can pass through a DHCP relay.

EXAMPLE WITH PPP

Figure 2:
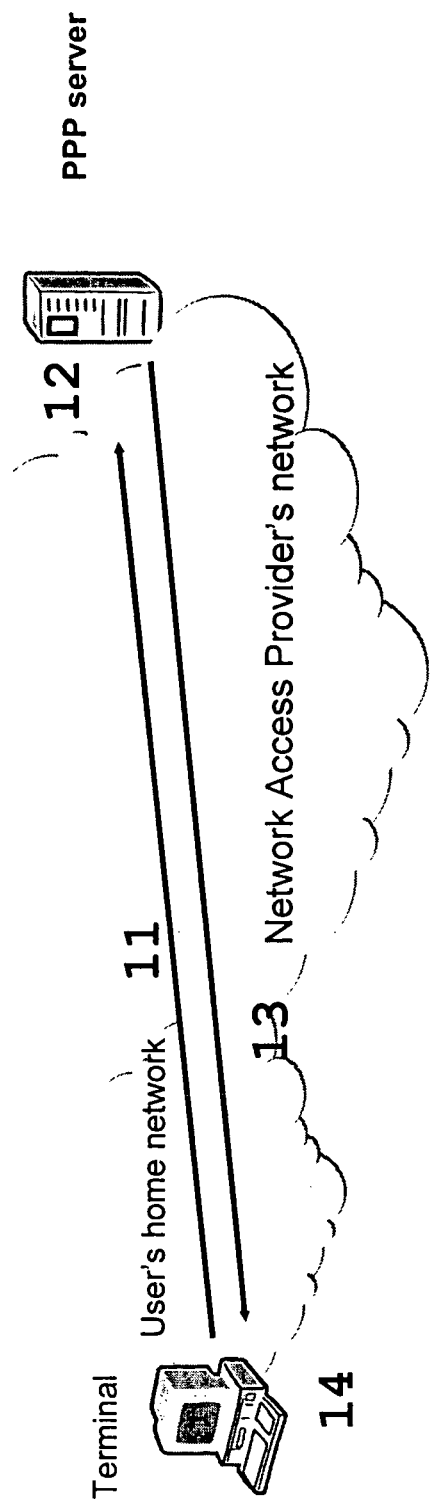
FIG. 2 illustrates a dynamic MAC address change, using PPPoE as auto-configuration.

The PPP over Ethernet (PPPoE) is initiated by a home device, such as a PC or a modem in routed mode, by sending a broadcast PADI message (PPPoE Active Discovery Initiation) ('11' in FIG. 2). The PPPoE server then retrieves the Source MAC address ('12' in FIG. 2), i.e. the MAC address of the user device, from the received PADI packet, whereupon the server can then decide to change this MAC address. The PPPoE server can tag (in the TAG field) its PADO (PPPoE Active Discovery Offer) message with the new MAC address ('13' in FIG. 2), indicating to the user to overwrite its MAC address ('14' in FIG. 2). The PPP process subsequently proceeds using the new MAC address.

The method disclosed in the invention offers many advantages:

- The MAC address uniqueness is guaranteed in the network, without any need for a special proxy and without processing power required at the DSLAM to change to MAC addresses of all frames in case of Ethernet MAC Address Translation (EMAT), and without using the heavy and non-scalable method of hiding the user MAC address in a Virtual LAN.
- It gives through the auto-configuration mechanisms full control to the operator of the users' MAC addresses. The operator can also decide to overwrite all MAC addresses, for example, in order to install a hierarchy in the MAC addresses of its network. This is performed only once at configuration.
- The method is clean, simple and secure with message authentication plus user authentication for DHCP and PAP or CHAP for PPP. The user, authentication can be achieved during session establishment e.g. by generating a credential based upon a user password associated to the user and a session parameter determined by the user equipment for the session being established. Unique user identification, the session parameter and the generated credential are put in a message, which is subsequently forwarded to an authentication device. The received credential is then verified based upon the received session parameter and the user password associated to the received user identification, thereby providing the authentication for the user.
- If the user tries to change its MAC address (or Attack for hacker), connectivity can be denied with the IEEE 802.1x protocol.

The invention claimed is:

1. A method to control and to change dynamically a media access control (MAC) address in an aggregation network containing at least a server computer device and a client device during auto-configuration of a network address, said method comprising:
    sending from said client device to a server computer device a first auto-configuration message containing the MAC address of said client computer device;
    retrieving said MAC address from said first auto-configuration message at said server computer device;
    checking if said MAC address included in said first auto-configuration message is in use in said network or if said server computer device has decided wants to change all MAC addresses in said aggregation network;
    if said checking indicates that said MAC address is in use or that said server computer device has decided to change all of said MAC addresses, sending from said server computer device to said client device a second auto-configuration message containing a new MAC address for said client; and
    overwriting said MAC address with said new MAC address included in said second auto-configuration message in said client device.

2. The method as in claim 1, wherein said first auto-configuration message containing the MAC address of said client computer device is a dynamic host configuration protocol (DHCP) discover message.

3. The method as in claim 1 wherein said first auto-configuration message containing the MAC address of said client computer device is a broadcast point-to-point protocol over Ethernet (PPPoE) Active Discovery Initiation message.

4. The method as in claim 2, wherein said second auto-configuration message containing a new MAC address for said client is an option of the DHCP protocol.

5. The method as in claim 3, wherein said second auto-configuration message containing a new MAC address for said client is a PPPoE Active Discovery Offer.

6. A client device, having a MAC address and communicatively coupled with a server computer device, said client device being arranged for:
    transmitting said MAC address to said server computer device;
    receiving a new MAC address from said server computer device; and
    changing said MAC address into said new MAC address upon reception of an auto-configuration message for a configuration of a network address from said server computer device containing said new MAC address.

7. A server computer device in an aggregation network comprising at least one client device, said server computer device being arranged for:
    receiving auto-configuration messages for configuration of a network address containing MAC addresses of said client device;
    checking if an operator has decided to change all MAC addresses in said aggregation network or if said MAC address of said client device included in an auto-configuration message is already in use;
    selecting a new MAC address for said client device; and
    sending the auto-configuration message to said client device comprising said new MAC address.

8. A non-transitory computer program product for enabling a computer to control and to change dynamically a media access control (MAC) address in an aggregation network during auto-configuration of a network address containing at least a server computer device and a client device, comprising:
    a computer-readable medium bearing software instructions for enabling said computer to perform predetermined operations, said predetermined operations comprising:
        sending from said client device to a server computer device a first auto-configuration message containing the MAC address of said client computer device;
        retrieving said MAC address from said first auto-configuration message at said server computer device;
        checking if said MAC address included in said first auto-configuration message is in use in said network or if said server computer device has decided to change all MAC addresses in said aggregation network;
        if said checking indicates that said MAC address is in use or that said server computer device has decided to change all of said MAC addresses, sending from said server computer device to said client device a second auto-configuration message containing a new MAC address for said client; and overwriting said MAC address with said new MAC address included in said second auto-configuration message in said client device.

\* \* \* \* \*